US008749515B2

(12) United States Patent
Kim et al.

(10) Patent No.: US 8,749,515 B2
(45) Date of Patent: Jun. 10, 2014

(54) LIQUID CRYSTAL DISPLAY DEVICE HAVING TOUCH SENSOR EMBEDDED THEREIN, METHOD OF DRIVING THE SAME AND METHOD OF FABRICATING THE SAME

(75) Inventors: Cheol-Se Kim, Daegu (KR); Ji-Hyun Jung, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 235 days.

(21) Appl. No.: 12/980,855

(22) Filed: Dec. 29, 2010

(65) Prior Publication Data

US 2011/0316809 A1 Dec. 29, 2011

(30) Foreign Application Priority Data

Jun. 25, 2010 (KR) .................. 10-2010-0060844

(51) Int. Cl.
*G06F 3/045* (2006.01)
(52) U.S. Cl.
USPC .......................................... 345/174; 345/87
(58) Field of Classification Search
USPC ............................................................ 438/10
See application file for complete search history.

(56) References Cited

U.S. PATENT DOCUMENTS

| | | | | | |
|---|---|---|---|---|---|
| 5,392,058 | A | * | 2/1995 | Tagawa | 345/104 |
| 6,011,531 | A | * | 1/2000 | Mei et al. | 345/92 |
| 6,501,529 | B1 | * | 12/2002 | Kurihara et al. | 349/160 |
| 7,554,616 | B1 | * | 6/2009 | Takemura | 349/38 |
| 2002/0044208 | A1 | * | 4/2002 | Yamazaki et al. | 348/272 |
| 2004/0169625 | A1 | * | 9/2004 | Park et al. | 345/87 |
| 2004/0227743 | A1 | * | 11/2004 | Brown | 345/204 |
| 2005/0259168 | A1 | * | 11/2005 | Kameshima et al. | 348/303 |
| 2006/0231838 | A1 | * | 10/2006 | Kim | 257/59 |
| 2007/0024546 | A1 | * | 2/2007 | Jang et al. | 345/78 |
| 2007/0126682 | A1 | * | 6/2007 | Liu et al. | 345/92 |
| 2008/0055502 | A1 | * | 3/2008 | Wu et al. | 349/38 |

(Continued)

FOREIGN PATENT DOCUMENTS

| | | |
|---|---|---|
| CN | 1527274 A | 9/2004 |
| CN | 101153972 A | 4/2008 |
| CN | 101446876 A | 6/2009 |
| JP | 2004-264846 | 9/2004 |

OTHER PUBLICATIONS

Office Action issued in corresponding Chinese Patent Application No. 201010588073.9, mailed Jul. 3, 2013, 28 pages.

*Primary Examiner* — Amare Mengistu
*Assistant Examiner* — Antonio Xavier
(74) *Attorney, Agent, or Firm* — Brinks Gilson & Lione (57) ABSTRACT

A liquid crystal display device having a touch sensor embedded therein is disclosed. The present invention includes a liquid crystal layer between first and second substrates, a pixel on the second substrate to apply a horizontal electric field to the liquid crystal layer, a touch sensor on the second substrate, the touch sensor detecting a touch by forming a touch capacitor with a touch object for touching the first substrate, and a readout line outputting a sensing signal from the touch sensor. The touch sensor includes a sensing electrode on the second substrate to form the sensing capacitor with the touch object, first and second sensor gate lines, a first sensor thin film transistor supplying a sensing driving voltage to the sensing electrode in response to a control of the first sensor gate line, and a second sensor thin film transistor supplying electric charges of the sensing electrode as the sensing signal in response to a control of the second sensor gate line.

16 Claims, 7 Drawing Sheets

(56) References Cited

U.S. PATENT DOCUMENTS

| | | | |
|---|---|---|---|
| 2008/0074401 A1* | 3/2008 | Chung et al. | 345/175 |
| 2008/0297709 A1* | 12/2008 | Eguchi | 349/139 |
| 2008/0309627 A1* | 12/2008 | Hotelling et al. | 345/173 |
| 2009/0002312 A1* | 1/2009 | Son | 345/104 |
| 2009/0096760 A1* | 4/2009 | Ma et al. | 345/174 |
| 2009/0115735 A1* | 5/2009 | Chuang | 345/173 |
| 2009/0115741 A1* | 5/2009 | Wang et al. | 345/173 |
| 2009/0135158 A1* | 5/2009 | Takahashi et al. | 345/174 |
| 2009/0159886 A1* | 6/2009 | Street | 257/59 |
| 2009/0237343 A1* | 9/2009 | Shibazaki et al. | 345/92 |
| 2009/0278810 A1* | 11/2009 | Ma et al. | 345/173 |
| 2009/0303193 A1* | 12/2009 | Lim et al. | 345/173 |
| 2010/0026636 A1* | 2/2010 | Jang et al. | 345/173 |
| 2010/0103121 A1* | 4/2010 | Kim et al. | 345/173 |
| 2010/0134429 A1* | 6/2010 | You et al. | 345/173 |
| 2010/0134457 A1* | 6/2010 | Katoh et al. | 345/207 |
| 2010/0225612 A1* | 9/2010 | Ishizaki et al. | 345/174 |
| 2011/0057908 A1* | 3/2011 | Park et al. | 345/176 |
| 2011/0102365 A1* | 5/2011 | Park et al. | 345/174 |
| 2011/0221697 A1* | 9/2011 | Okamoto et al. | 345/173 |

* cited by examiner

LIQUID CRYSTAL DISPLAY DEVICE
HAVING TOUCH SENSOR EMBEDDED
THEREIN, METHOD OF DRIVING THE
SAME AND METHOD OF FABRICATING THE
SAME

This application claims the benefit of the Korean Patent Application No. 10-2010-0060844, filed in Korea on Jun. 25, 2010, which are hereby incorporated by reference as if fully set forth herein.

BACKGROUND

1. Field of the Invention

The present disclosure relates to a liquid crystal display device having a touch sensor embedded therein, method of driving the same and method of fabricating the same. Although the present disclosure is suitable for a wide scope of applications, it is particularly suitable for a slim and light liquid crystal display having a touch sensor embedded therein.

2. Discussion of the Related Art

Recently, touchscreens that enable information input to a screen of a display are widely applied as information input devices for a computer system. Since a user is able to move or select display information by simply touching a screen with a finger or stylus pen, a touchscreen is easy to use for men and women of all ages.

A touchscreen outputs touch information by detecting a touch performed on a display screen and a corresponding touched position. A computer system analyzes the touch information and then executes a corresponding command.

Flat panel display such as a liquid crystal display (LCD), a plasma display panel (PDP), an organic light emitting diode (OLED) display and the like are widely used as displays.

Touchscreen technology includes one of a resistant film type, a capacitance type, an infrared type, an ultrasonic type, an electromagnetic type and the like according to a sensing principle. Specifically, the resistant film type touchscreen or the capacitance type touchscreen is widely used due to their advantages of manufacturing cost.

A resistant-film type touchscreen is configured to detect a touch by sensing a change of voltage generated when top and bottom resistant films (transparent conductive films) come in contact with each other by a touch pressure. Yet, a touchscreen or display is vulnerable to a touch pressure applied to the resistant-film type touchscreen. And, the resistant-film type touchscreen has a low transmissivity due to light scattering in an air layer between resistant layers.

A touchscreen of a capacitance type, which compensates the disadvantages of the resistant-film type, detects a touch by sensing a change of capacitance generated when a small quantity of electric charges move to a touch point touched with a human body or stylus pen. The capacitance type touchscreen uses a tempered glass, thereby receiving wide attention due to its strong durability, high transmissivity, excellent touch-sensing capability and multi-touch feasibility.

Generally, a touchscreen is manufactured as a panel and is then attached to a topside of a display to perform a touch input function.

However, a touch panel attached display is manufactured in a manner of attaching a separately fabricated touch panel to a display, whereby a manufacturing cost is raised. Moreover, as overall volume and weight of a system increase, mobility of the corresponding system is lowered or limitation is put on designing the corresponding system.

BRIEF SUMMARY

A touch sensor embedded liquid crystal display device includes a liquid crystal layer between top and bottom substrates, a pixel provided to each pixel area of the bottom substrate to apply a horizontal electric field to the liquid crystal layer in the pixel area using a pixel electrode supplied with a data signal via a thin film transistor connected to gate and data lines and a common electrode connected to a common line, a touch sensor provided to each space between one group of pixels and another group of pixels on the bottom substrate, the touch sensor detecting a touch by forming a touch capacitor with a touch object for touching the top substrate, and a readout line outputting a sensing signal from the touch sensor. In this case, the touch sensor includes a sensing electrode provided to the bottom substrate to form the sensing capacitor with the touch object, first and second sensor gate lines, a first sensor thin film transistor supplying a sensing driving voltage to the sensing electrode in response to a control of the first sensor gate line, and a second sensor thin film transistor supplying electric charges of the sensing electrode as the sensing signal in response to a control of the second sensor gate line.

Preferably, the first and second sensor gate lines are sequentially driven.

In another aspect of the present invention, a method of driving a liquid crystal display device, in which a touch sensor is embedded, includes the steps of storing data in a plurality of pixels by driving gate and data lines in a data write interval, applying a horizontal electric field according to data to a liquid crystal layer of each pixel, and detecting a touch according to an electrostatic capacitance formed between a touch object touching a top substrate of the liquid crystal display device and the touch sensor by driving the touch sensor provided to each space between one group of pixels and another group of pixels, the touch detecting step including the steps of supplying a power voltage to a sensing electrode of the touch sensor by driving a first sensor thin film transistor and outputting electric charges of the sensing electrode generated from the touch detection to a readout line as a sensing signal.

In a further aspect of the present invention, a method of fabricating a touch sensor embedded liquid crystal display device includes the steps of forming a gate metal pattern including gate electrodes of a pixel thin film transistor and first and second sensor thin film transistors on a substrate together with a gate line, a common line and first and second sensor gate lines, forming a common electrode connected to the common line, forming a gate insulating layer on the substrate having the gate metal pattern and the common electrode formed thereon, forming semiconductor layers of the pixel and first and second sensor thin film transistors on the gate insulating layer, respectively, forming a data metal pattern including source and drain electrodes of the pixel and first and second sensor thin film transistors on the gate insulating layer having the semiconductor layers formed thereon together with a data line, a power line and a readout line, forming a passivation layer to cover the data metal pattern, forming a plurality of contact holes in the passivation layer, forming a pixel electrode on the passivation layer to be connected to the drain electrode of the pixel thin film transistor via the contact hole to form a horizontal electric field with the common electrode; and forming a sensing electrode together with the gate line, the common electrode, or the pixel electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
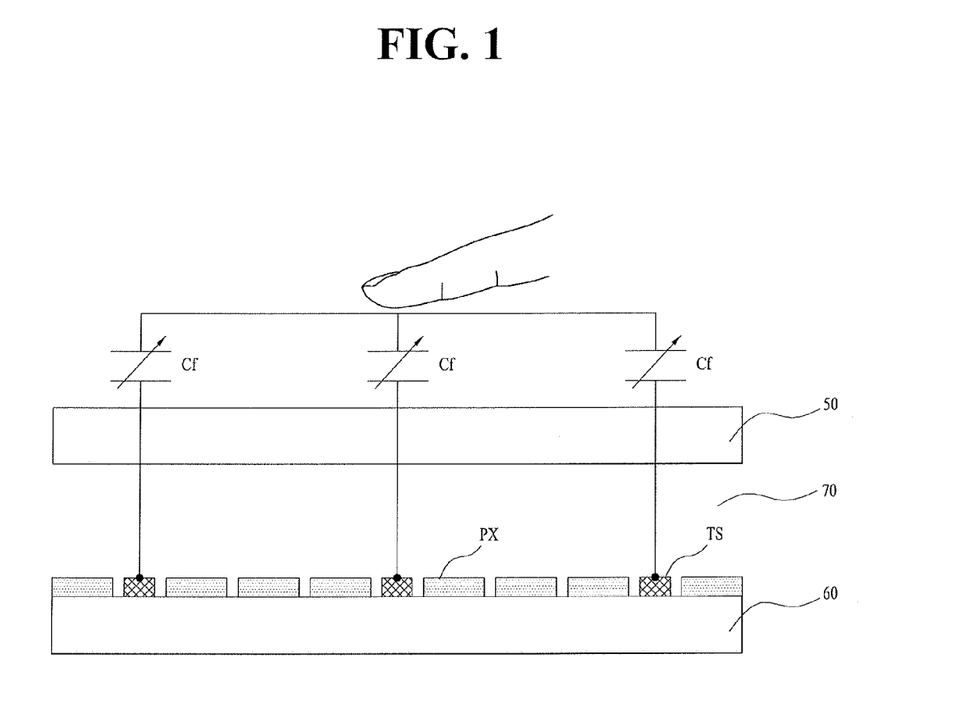
FIG. 1 is a schematic diagram of a vertical polyhedral structure of a liquid crystal display device having a touch sensor embedded therein according to an embodiment of the present invention.

FIG. 1 is a schematic diagram of a vertical polyhedral structure of a liquid crystal display device having a touch sensor embedded therein according to an embodiment of the present invention.

Referring to FIG. 1, a liquid crystal display (hereinafter abbreviated LCD) device includes a top substrate 50, a bottom substrate 60 and a liquid crystal layer 70 provided between the top and bottom substrates 50 and 60.

On the bottom substrate 60, a thin film transistor (hereinafter abbreviated TFT) substrate including a plurality of pixels PX and a plurality of touch sensors TS are formed. In this case, each of the touch sensors TS is provided to each space between adjacent pixel groups, each of which includes a plurality of the pixels. So to speak, a plurality of the pixels PX are located between the adjacent touch sensors TS to each other. Each of the pixels PX drives the liquid crystal layer 70 in in-plane switching (IPS) mode or fringe field switching mode by applying a horizontal electric field to the liquid crystal layer 70. For this, each pixel PX includes a pixel electrode supplied with a data signal via a TFT connected to gate and data lines and a common electrode supplied with a common voltage to apply the horizontal electric field to the liquid crystal layer 70 together with the pixel electrode. Since each pixel PX of the bottom substrate 60 applied the horizontal electric field applied to the liquid crystal layer 70, an electrode for driving the liquid crystal layer is not necessary for the top substrate 50. On the top substrate 50, formed are a black matrix defining the pixels PX and a color filter array including red, green and blue color filters respectively corresponding to the pixels PX. And, the LCD device further includes top and bottom polarizing plates attached to outer surfaces of the top and bottom substrates 50 and 60 to have optical axes orthogonal to each other, respectively and top and bottom alignment layers respectively provided to inner surfaces contacting with liquid crystals to set a pre-tilt angle of the liquid crystals.

If a user touches a surface of the top substrate 50 with such a conductive touch object as a human body, a stylus pen and the like, the touch object and the touch sensor TS on the bottom substrate 60 form capacitance, i.e., a sensing capacitor Cf in a manner of leaving the top substrate 50 and the liquid crystal layer 70 in-between. The touch sensor TS detects a capacitance change according to the formation of the sensing capacitor Cf and then outputs a sensor signal indicating the corresponding touch.

Figure 2:
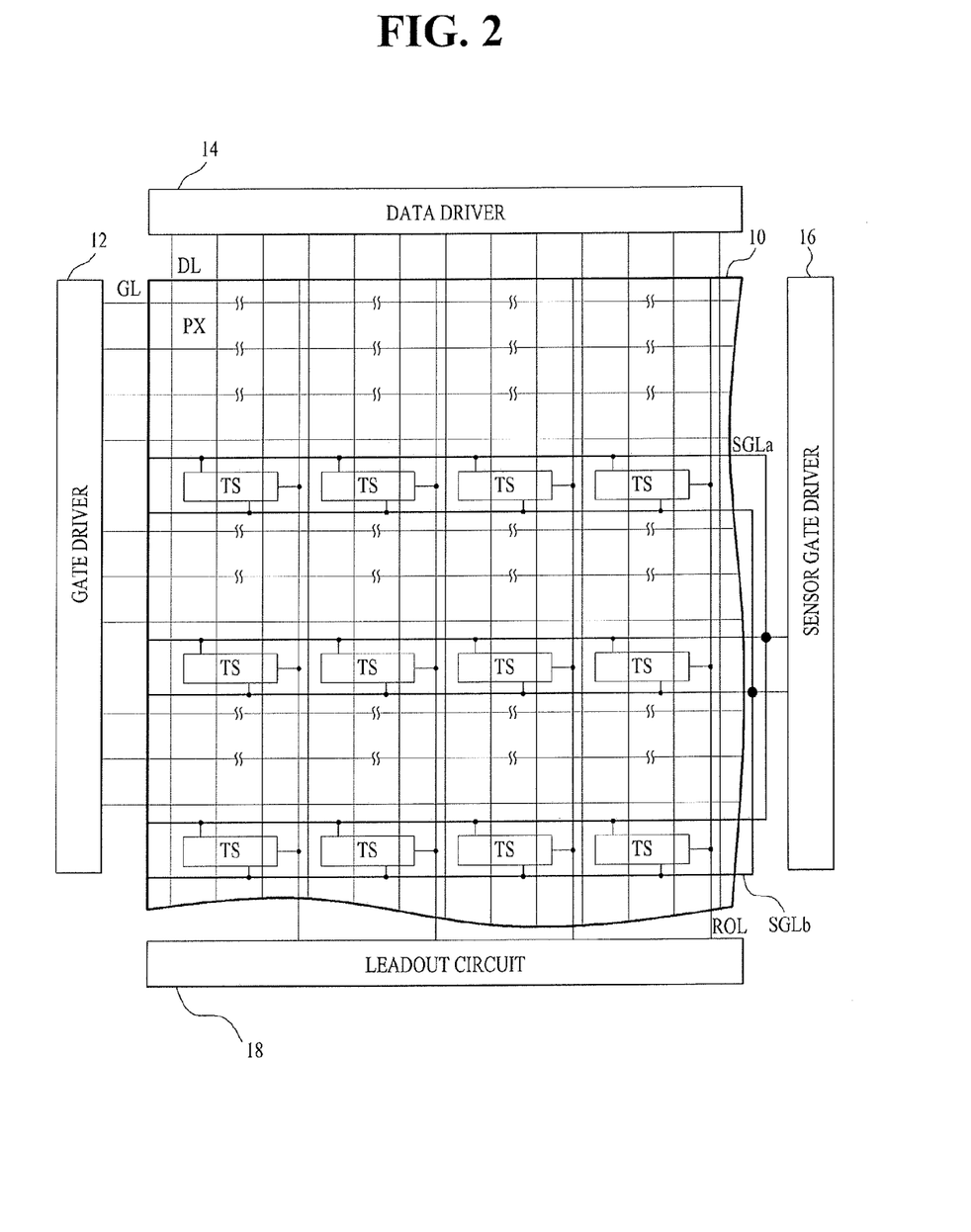
FIG. 2 is a schematic block diagram of a liquid crystal display device having a touch sensor embedded therein according to an embodiment of the present invention.

FIG. 2 is a schematic block diagram of a liquid crystal display device having a touch sensor embedded therein according to an embodiment of the present invention.

Referring to FIG. 2, an LCD device includes an LCD panel 10 having a plurality touch sensors TS embedded therein together with a plurality of pixels PX, a gate driver 12 driving a plurality of gate lines GL of the LCD panel 10, a data driver 14 driving a plurality of data lines DL of the LCD panel 10, a sensor gate driver 16 driving a sensor gate line SGL of the LCD panel 10, and a readout circuit 18 detecting a touch by monitoring an output of a readout line ROL of the LCD panel 10. Optionally, in FIG. 2, the readout circuit 18 is built in the data driver 14 and/or the sensor gate driver 16 is built in the gate driver 12. The sensor gate driver 16 may be positioned at an opposite side to the gate driver 12

The LCD panel 10 includes a plurality of pixels PX defined in a manner that a plurality of the gate lines GL and a plurality of the data lines DL cross with each other. And, each touch sensor TS is provided to a space between one group of the pixels PX and another group of the pixels PX. The touch sensor TS driven by a pair of the sensor gate lines SGLa and SGLb, detects a touch using a capacitance, and then outputs a sensing signal to the readout line ROL. A first sensor gate line SGLa of the sensor gate line pair SGLa and SGLb is first driven to determine a duration for supplying a sensing driving voltage Vd to the corresponding touch sensor TS. Subsequently, a second sensor gate line SGLb is driven to determine a duration for outputting the sensing signal to the readout line ROL from the corresponding touch sensor TS.

The readout line ROL is provided to each space between one group of the data lines DL and another group of the data lines DL in parallel with the corresponding data line DL and is connected to a plurality of the touch sensors TS arranged in a vertical direction. The sensor gate line pair SGLa and SGLb is provided to each space between one group of the gate lines GL and another group of the gate lines GL in parallel with the corresponding gate line GL and is connected to a plurality of the touch sensors TS arranged in a horizontal direction. A plurality of the sensor gate lines SGL are independently driven per line. Alternatively, if a plurality of the sensor gate lines SGL are grouped by a predetermined number unit, a predetermined number of the first sensor gate lines SGLa are driven in common and a predetermined number of the second sensor gate lines SGLb are driven in common. As a plurality of the touch sensors TS are arranged in a matrix form, multiple touches can be simultaneously detected.

Figure 3:
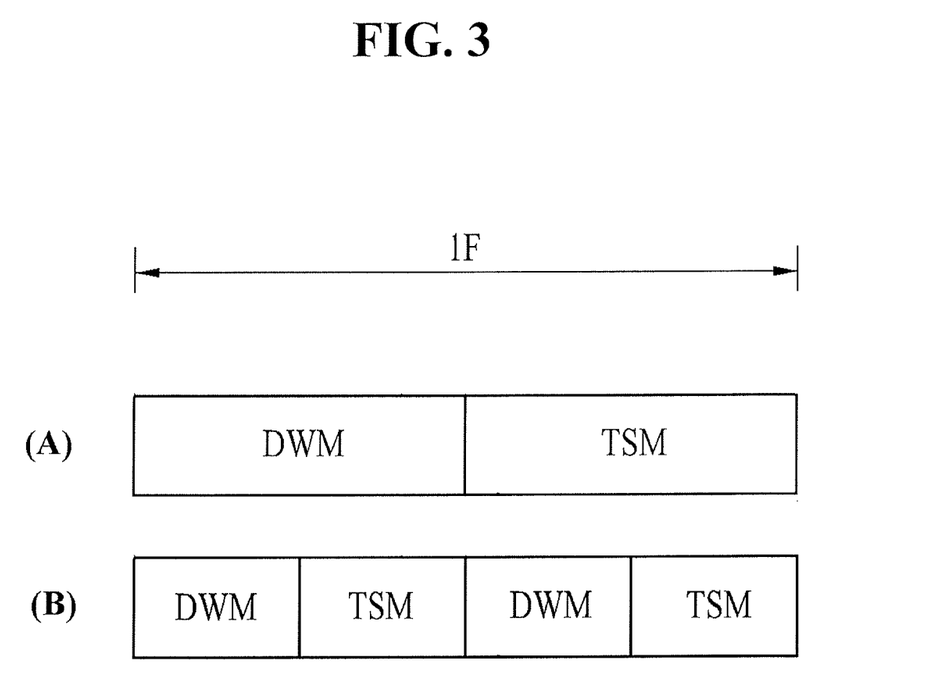
FIG. 3 is a diagram for configuration of a single frame in a liquid crystal display device h according to an embodiment of the present invention.

The LCD panel 10, as shown in FIG. 3, is driven in a manner that a frame interval 1F is divided into a data write interval DWM for storing data in a pixel PX and a touch sensing interval TSM for driving a touch sensor TS. For instance, referring to FIG. 3(A), a frame 1F can be divided into a data write interval DWM for storing data signals in a plurality of pixels PX by scanning a plurality of gate lines GL for the first half and a touch sensing interval TSM for driving a touch sensor TS by scanning a plurality of sensor gate lines SGLa and SGLb for the second half. Meanwhile, referring to FIG. 3(B), a frame 1F is divided into a plurality of horizontal intervals (e.g., horizontal lines), whereby a data write interval DWM and a touch sensing interval TSM can alternate with each other.

In the data write interval DWM, the gate driver 12 sequentially drives a plurality of the gate lines GL. And, the data driver 14 supplies a data signal to a plurality of the data lines DL each time the gate line GL is driven.

In the touch sensing interval TSM, the sensor gate driver sequentially drives the first and second sensor gate lines SGLa and SGLb. And, the readout circuit 18 detects a touch and a touched position by receiving an input of a sensing signal from the touch sensor TS having detected the touch via the readout line ROL. In doing so, the readout circuit 18 detects the touch by integrating an output current of the readout line ROL per unit time. The readout circuit 18 detects a touched position (e.g., XY coordinates) based on position information (e.g., X coordinate) of the readout line ROL and position information (e.g., Y coordinate) of the driven sensor gate line pair SGLa and SGLb. And, the readout circuit 18 is able to detect multiple touches simultaneously occurring at different points via the touch sensor TS and the readout line ROL.

Figure 4:
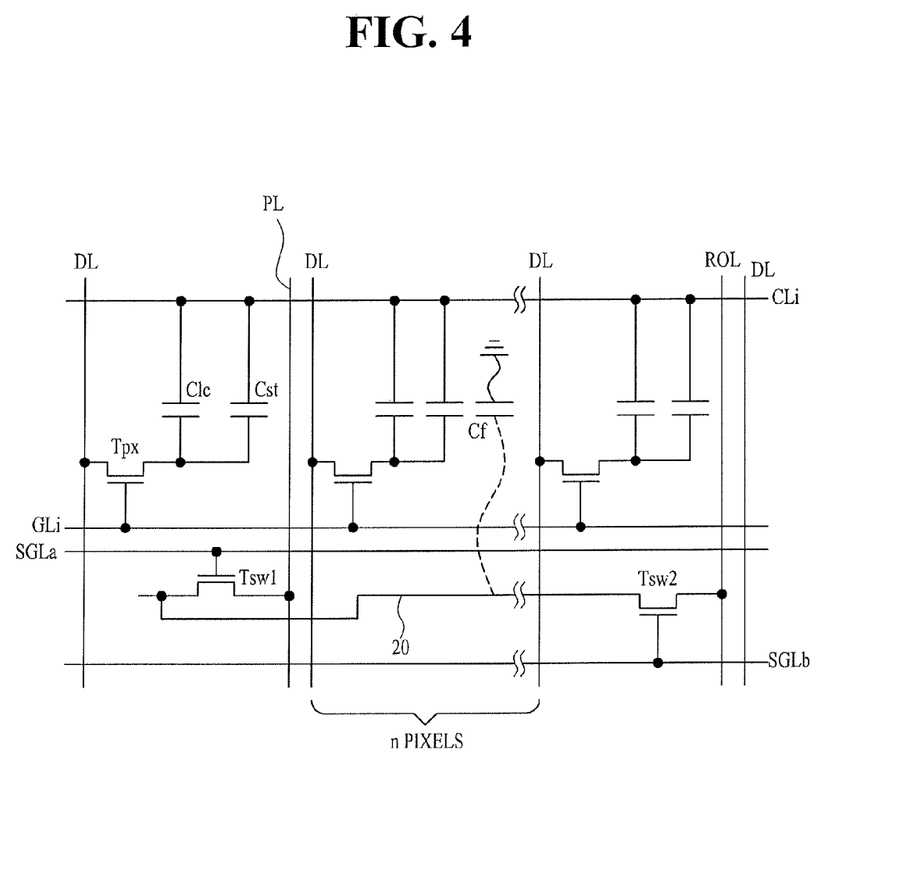
FIG. 4 is a diagram of an equivalent circuit for partial pixels of a liquid crystal display device having a touch sensor embedded therein according to an embodiment of the present invention.
Figure 5:
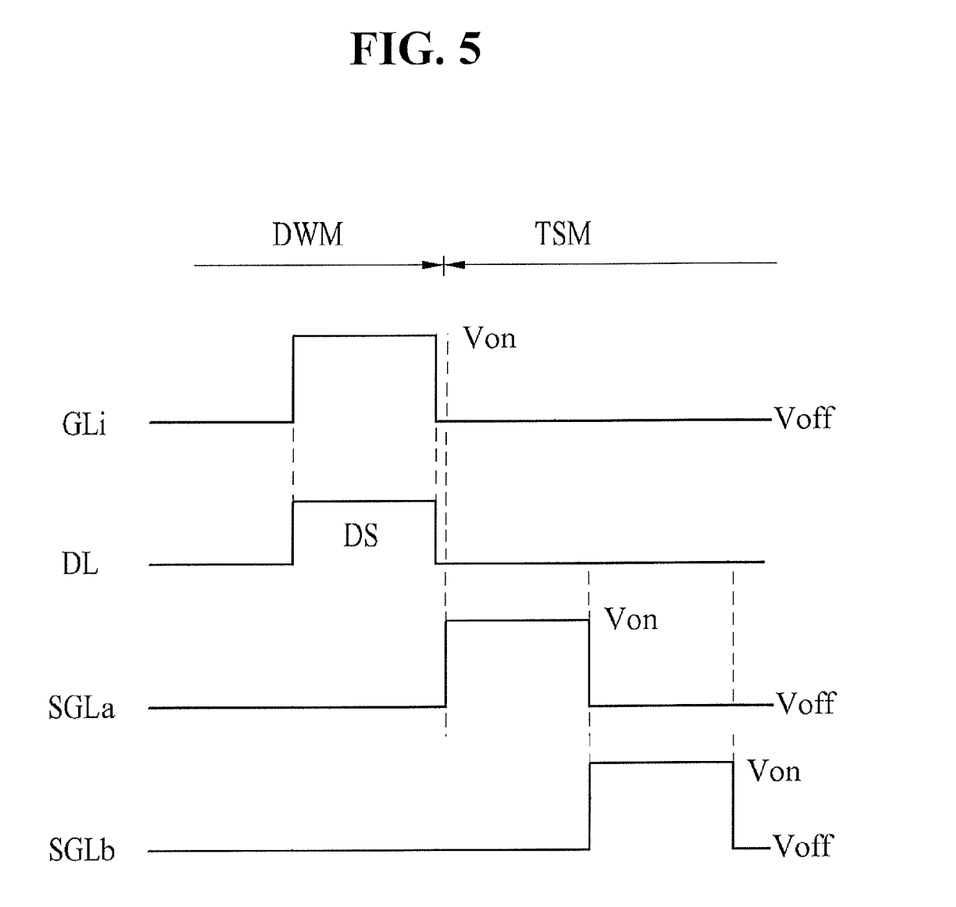
FIG. 5 is a diagram of driven waveforms for the equivalent circuit shown in FIG. 4.

FIG. 4 is a diagram of an equivalent circuit for partial pixels of a liquid crystal display device having a touch sensor embedded therein according to an embodiment of the present invention, and FIG. 5 is a diagram of driven waveforms for the equivalent circuit shown in FIG. 4.

Referring to FIG. 4, an LCD device includes a plurality of pixels PX and a touch sensor TS of a capacitance type provided to each space between one group of pixels PX and another group of pixels PX.

Each of the pixels PX includes a pixel TFT Tpx provided to each pixel area defined by gate and data lines GLi and DL crossing with each other, a liquid crystal capacitor Clc connected between the pixel TFT Tpx and a common line CLi, and a storage capacitor Cst connected between the pixel TFT Tpx and the common line CLi in parallel with the liquid crystal capacitor Clc. In particular, the gate line GLi and the common line CLi are formed in parallel with each other by leaving the pixel area in-between. The liquid crystal capacitor Clc includes a pixel electrode connected to the pixel TFT Tpx, a common electrode connected to the common line CLi and a liquid crystal layer having a horizontal electric field applied thereto by the pixel and common electrodes. And, the storage capacitor Cs is formed in a manner that the pixel and common electrodes are overlapped with each other by leaving an insulating layer in-between.

The pixel TFT Tpx, as shown in FIG. 5, supplies a data signal DS from the data line DL to be stored in the liquid crystal capacitor Clc and the storage capacitor Cst in response to a gate-on voltage Von of a gate signal from the corresponding gate line GLi in a data write interval DWM. Liquid crystals are driven by the data signal stored in the liquid crystal capacitor Clc. And, the storage capacitor Cst enables the liquid crystal capacitor Clc to maintain the data signal stably.

A touch sensor TS is provided to a space between the gate line GLi and a storage line (not shown in the drawing) of a next stage. The touch sensor TS includes a sensing electrode 20 for forming a sensing capacitor Cf together with a touch object, a sensor gate line pair SGLa and SGLb, a first sensor TFT Tsw1 forming one current path between a power line PL (or a common line CLi) and one end portion of the sensing electrode 20 in response to a control of the first sensor gate line SLGa, and a second sensor TFT Tsw2 forming another current path between a readout line ROL and the other end portion of the sensing electrode 20 in response to a control of the second sensor gate line SGLb. In particular, the touch sensor TS is provided to a space between one group of n pixels (n: natural number) and another group of n pixels in consideration of a size of a touch point. For instance, if a line width of a touch point is about 4 mm, the touch sensor TS can be provided to the space between 50 pixels and 50 pixels.

The sensor gate line pair SGLa and SGLb is formed in parallel with the gate line GLi. And, the sensing electrode 20 is formed between the sensor gate lines SGLa and SGLb in a manner of being separated by a touch sensor unit. The power line PL and the readout line ROL are formed in parallel with the data line DL by leaving a plurality of the data lines DL in-between.

In the first sensor TFT Tsw1, a gate electrode is connected to the first sensor gate line SGLa, a source electrode is connected to the power line PL or the common line CLi, and a drain electrode is connected to one end portion of the sensing electrode 20. The source electrode and the drain electrode can be switched to each other according to a current direction. The first sensor TFT Tsw1 supplies a sensing driving voltage Vd from the power line PL to the sensing electrode 20 in response to a gate signal supplied to the first sensor gate line SGLa. The first sensor TFT may be connected to the common line CLi instead of the power line PL and supplies the common voltage as the sensing driving voltage Vd to the sensing electrode 20. In this case, the power line PL may be omitted.

In the second sensor TFT Tsw2, a gate electrode is connected to the second sensor gate line SGLb, a source electrode is connected to the readout line ROL, and a drain electrode is connected to the other end portion of the sensing electrode 20. The source electrode and the drain electrode can be switched to each other according to a current direction. Once a touch capacitor Cf is formed, the second sensor TFT Tsw2 outputs a sensing signal proportional to a size of the touch capacitor Cf to the readout line ROL.

Particularly, the first sensor TFT Tsw1 is turned on by the gate-on voltage Von of the first sensor gate line SGLa in the touch sensing interval TSM shown in FIG. 5 and then supplies the sensing driving voltage Vd from the power line PL to the sensing electrode 20. While the gate-on voltage Vd is supplied to the sensing electrode 20, if a surface of the LCD device is touched with a touch object, the sensing capacitor Cf is formed between the touch object and the sensing electrode 20. In doing so, referring to Formula 1, an electric charge quantity Q1 supplied to the sensing electrode depends on a multiplication of the sensing driving voltage Vd supplied to the sensing electrode 20 and a sum of an electrostatic capacitance of the sensing capacitor Cf and a parasitic electrostatic capacitance Cpara formed between the sensing electrode 20 and a neighbor line.

$$Q1 = (Cf + Cpara) \times Vd \qquad \text{[Formula 1]}$$

Subsequently, the second sensor TFT Tsw2 is turned on the gate-on voltage Von of the second sensor gate line SGLa in the touch sensing interval TSM shown in FIG. 5 and then outputs a sensing signal, which corresponds to the electric charge quantity Q1 derived to the sensing electrode 20 by the touch to the sensing electrode 20, to the readout line ROL. In doing so, if a reference voltage Vref is supplied to the readout line ROL from the readout circuit, referring to Formula 2, an electric charge quantity delivered to the readout line ROL from the sensing electrode 20 via the second sensor TFT Tsw2 is determined as a multiplication (Cf+Cpara)×(Vd−Vref) of "a sum (Cf+Cpara) of an electrostatic capacitance of the sensing capacitor Cf and a parasitic electrostatic capacitance Cpara formed between the sensing electrode 20 and a neighbor line" and "a voltage difference (Vd−Vref) between the power voltage Vd supplied to the sensing electrode 20 and the reference voltage Vref supplied to the readout line ROL".

$$Q2=(Cf+Cpara)\times(Vd-Vref) \quad \text{[Formula 2]}$$

Hence, a sensing signal (i.e., an output current) proportional to the electric charge quantity Q2 outputted from the second sensor TFT Tsw2 to the readout line ROL is determined in proportion to a size of an electrostatic capacitance of the sensing capacitor. The readout circuit detects a touch by integrating the output current of the readout line ROL.

Therefore, since the sensing signal outputted to the readout line ROL from the sensing electrode 20 having detected the touch via the second sensor TFT Tsw2 is only determined by "a sum (Cf+Cpara) of an electrostatic capacitance of the sensing capacitor Cf and a parasitic electrostatic capacitance Cpara formed between the sensing electrode 20 and a neighbor line" and "a voltage difference (Vd−Vref) between the power voltage Vd supplied to the sensing electrode 20 and the reference voltage Vref supplied to the readout line ROL", it is able to output a precise sensing signal irrespective of a threshold voltage Vth despite that the threshold voltage Vth of the second sensor TFT Tsw2 is different.

Figure 6:
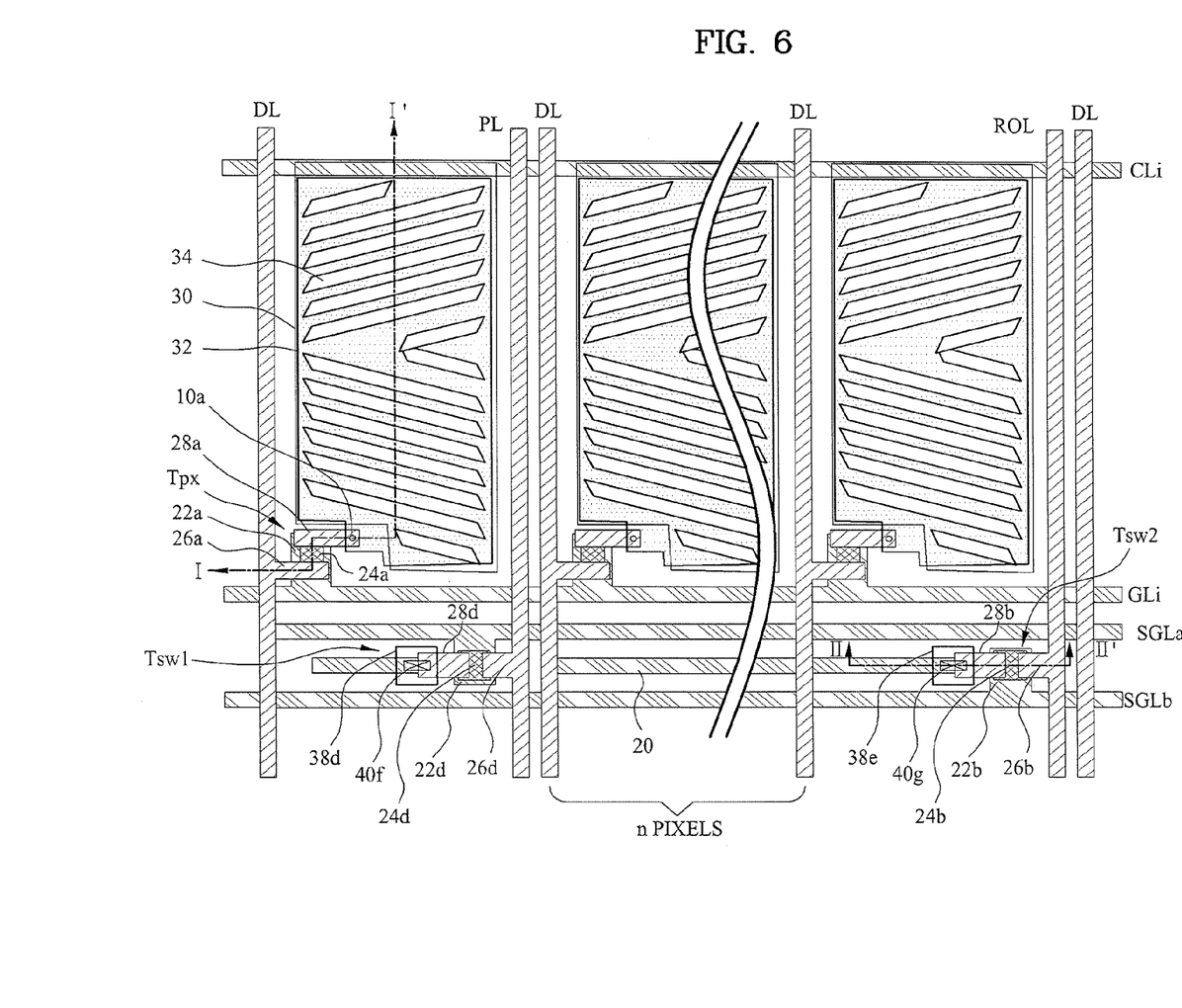
FIG. 6 is a layout of a TFT substrate for the equivalent circuit of the liquid crystal display device shown in FIG. 4.
Figure 7:
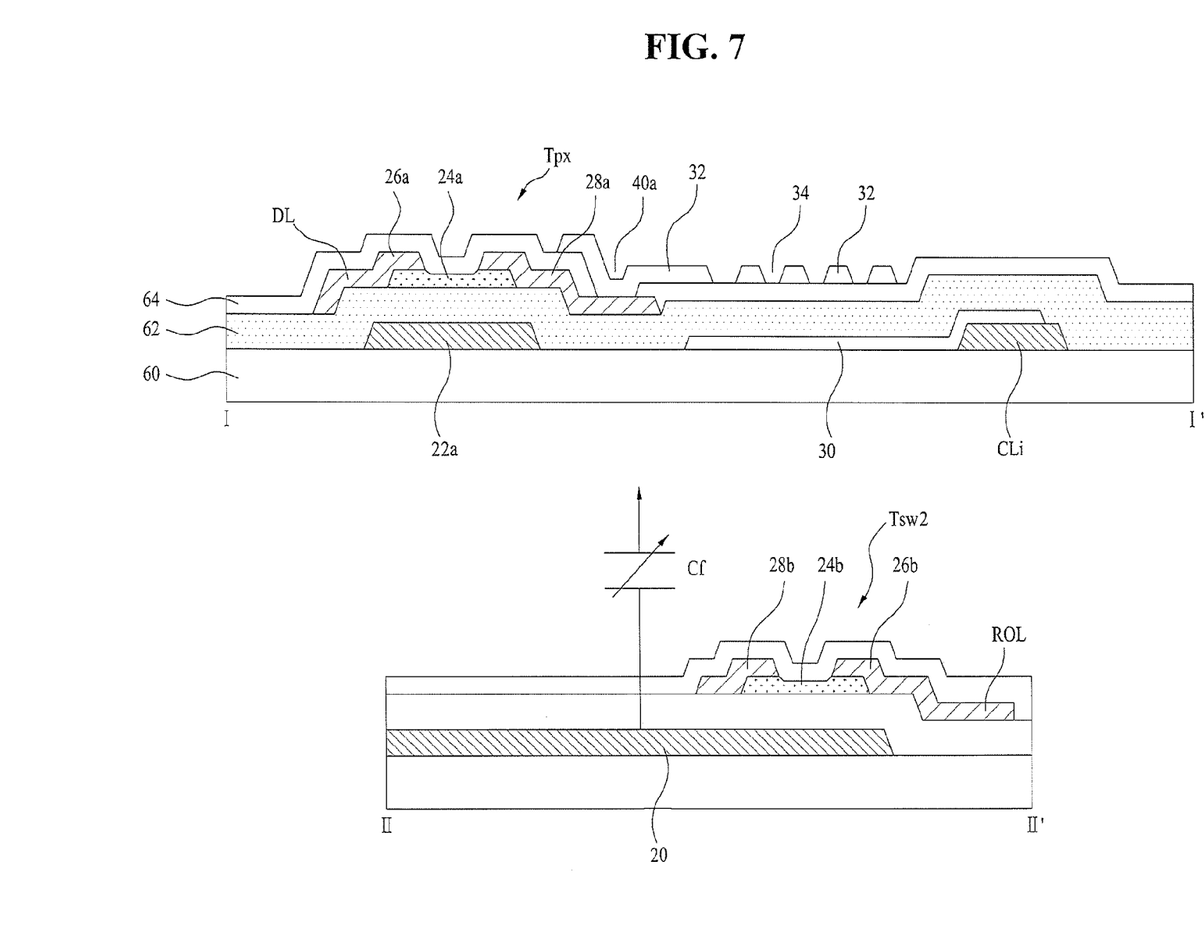
FIG. 7 is a cross-sectional diagram of the TFT substrate bisected along the cutting lines I-I' and II-II' shown in FIG. 6.

FIG. 6 is a layout of a TFT substrate for the equivalent circuit of the liquid crystal display device shown in FIG. 4, and FIG. 7 is a cross-sectional diagram of the TFT substrate bisected along the cutting lines I-I' and II-II' shown in FIG. 6.

Referring to FIG. 6 and FIG. 7, in a TFT substrate, a common line CLi, a gate line GLi, a sensing electrode 20 and sensor gate lines SGLa and SGLb are formed as a gate metal pattern on a bottom substrate 60 in parallel with each other. Data and readout lines DL and ROL crossing with the gate metal pattern are formed as a data metal pattern on a gate insulating layer 62 in parallel with each other.

A pixel TFT Tpx includes a gate electrode 22a protruding from the gate line GLi, a semiconductor layer 24a overlapped with the gate electrode 22a by leaving the gate insulating layer 62 in-between, a source electrode 26a protruding from the data line DL to be overlapped with the semiconductor layer 24a, and a drain electrode 28a connected to a pixel electrode 32 via a contact hole 40a of a passivation layer 64 by opposing the source electrode 26a in the overlapping part with the semiconductor layer 24a. The semiconductor layer 24a includes an active layer forming a channel between the source electrode 26a and the drain electrode 28a and an ohmic contact layer provided to the overlapping part between the source and drain electrodes 26a and 28a for the ohmic contact between the source and drain electrodes 26a and 28a.

A transparent common electrode 30 connected to the common line CLi is provided to each pixel area defined by the crossing of the common line CLi, the gate line GLi and the data line DL. The transparent common electrode 30 is formed on the substrate 60, on which the common line CLi has been formed, in a manner of being partially overlapped with the common line CLi before the gate insulating layer 62 is formed. A transparent pixel electrode 34 is formed on the passivation layer to be overlapped with the common electrode 30. The transparent pixel electrode 34 includes a plurality of inclining slits 34 configured symmetric in length direction to drive a liquid crystal layer by forming a horizontal electric field together with the common electrode 30. And, a storage capacitor Cs is generated as the pixel electrode 34 and the common electrode 30 are overlapped with each other.

In a space between the gate line GLi and a common line (not shown in the drawings) of a next stage, a touch sensor including first and second sensor gate lines SGLa and SGLb, a sensing electrode 20 and first and second sensor TFTs Tsw1 and Tsw2 is formed.

The first and second sensor gate lines SGLa and SGLb and the sensing electrode 20 are formed of gate metal together with the gate line GLi and the common line CLi. And, a power line PL and a readout line ROL are formed of data meal together with the data line DL. The sensing electrode 20 may be formed together with the common electrode 30 and the pixel electrode 34.

The first sensor TFT Tsw1 includes a gate electrode 22d protruding from the first sensor gate line SGLa, a semiconductor layer 24d overlapped with the gate electrode 22d by leaving the gate insulating layer 62 in-between, a source electrode 26d protruding from the power line PL to be overlapped with the semiconductor layer 24d, and a drain electrode 28d connected to the sensing electrode 20 by opposing the source electrode 26d at an overlapping part with the semiconductor layer 24d. The drain electrode 28d is connected to one end portion of the sensing electrode 20 via a contact hole 40f overlapped with one end portion of the sensing electrode 20 by perforating the passivation layer 64 and the gate insulating layer 62 both and a contact electrode 38d formed on the passivation layer 64 by penetrating the contact hole 40f. The first sensor TFT may be connected to the common line CL instead of the power line PL. In this case, the power line PL may be omitted.

The second sensor TFT TSM2 includes a gate electrode 22b protruding from the second sensor ate line SGLb, a semiconductor layer 24b overlapped with the gate electrode 22b by leaving the gate insulating layer 62 in-between, a source electrode 26b protruding from the readout line ROL to be overlapped with the semiconductor layer 24b, and a drain electrode 28b connected to the sensing electrode 20 by opposing the source electrode 26b at an overlapping part with the semiconductor layer 24b. The drain electrode 28b is connected to the other end portion of the sensing electrode 20 via a contact hole 40g overlapped with the other end portion of the sensing electrode 20 by perforating the passivation layer 64 and the gate insulating layer 62 both and a contact electrode 38e formed on the passivation layer 64 by penetrating the contact hole 40g.

A method of fabricating the TFT substrate shown in FIG. 6 and FIG. 7 is described as follows.

First of all, a gate metal pattern is formed on a substrate. In particular, the gate metal pattern includes a gate line GLi, a common line CLi, a sensing electrode 20, first and second sensing gate lines SGLa and SGLb, a gate electrode 22a of a pixel TFT Tpx, and gate electrodes 22d and 22b of first and second sensor TFTs Tsw1 and Tsw2.

A transparent electrode 30 connected to the common line CLi is formed in each pixel area.

A gate insulating layer 62 is formed on the substrate 60 including the common electrode 30. A semiconductor pattern including a semiconductor layer 24a of the pixel TFT Tpx, a semiconductor layer 24d of the first sensor TFT Tsw1, and a semiconductor layer 24b of the second sensor TFT Tsw2 is then formed on the gate insulating layer 62.

A data metal pattern is formed on the gate insulating layer 62 on which the semiconductor pattern has been formed. In this case, the data metal pattern includes a data line DL, a readout line ROL, a power line PL, source and drain electrodes 26a and 28a of the pixel TFT Tpx, source and drain electrodes 26d and 28d of the first sensor TFT Tsw1, and source and drain electrodes 26b and 28b of the second sensor TFT Tsw2.

A passivation layer 64 is formed on the gate insulating layer 62 on which the data metal pattern has been formed. And, a contact hole 40a perforating the passivation layer 64 and contact holes 40f and 40g respectively perforating the passivation layer 64 and the gate insulating layer 62 are then formed.

Subsequently, a transparent conductive pattern including a pixel electrode 32 and contact electrodes 38d and 38e is formed on the passivation layer 64.

Thus, an LCD device according to the present invention can have an embedded touch sensor using a TFT substrate fabricating process as it is.

Meanwhile, in FIG. 6 and FIG. 7, a horizontal electric field is formed using the transparent common electrode 30 and the transparent pixel electrode 32 having a plurality of the inclining slits 34 to be insulatedly overlapped with the common electrode 30 for example. Alternatively, another pixel structure can be formed in a manner that a common electrode and a pixel electrode are formed in a finger shape to form a horizontal electric field by finger parts of the common and pixel electrodes alternating with each other. In this case, the common or pixel electrode in the finger shape can be formed of non-transparent metal.

As mentioned in the foregoing description, the present invention provides the following effects and/or advantages.

First of all, the present invention is configured to have a touch sensor embedded in a TFT (thin film transistor) substrate, thereby enabling its slimness and lightness and reducing a manufacturing cost.

Secondly, the present invention includes a touch sensor of a matrix type, thereby detecting a multi-touch.

Thirdly, the present invention provides a simplified touch sensor for detecting a touch via electrostatic capacitance to each space between neighboring pixel groups, each of which includes a plurality of pixels, thereby raising an opening ratio.

Fourthly, the present invention fabricates a touch sensor by a TFT substrate fabricating process as it is, thereby simplifying a whole process to reduce a manufacturing cost.

Fifthly, the present invention drives a liquid crystal display device by discriminating a data writing interval and a touch sensing interval from each other, thereby preventing image quality degradation due to interference of a touch sensor.

Finally, since a sensing signal outputted to a readout line via a second sensor TFT from a sensing electrode having detected a touch depends on a sum (Cf+Cpara) of electrostatic capacitance of a sensing capacitor and a parasitic electrostatic capacitance (Cpara) and a voltage difference (Vd−Vref) between a power source voltage supplied to the sensing electrode and a reference voltage supplied to the readout line, whereby a precise sensing signal can be outputted irrespective of a threshold voltage (Vth) of the second sensor TFT.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A touch sensor embedded liquid crystal display device comprising:
   a liquid crystal layer between first and second substrates;
   a pixel provided for each pixel area of the second substrate to apply a horizontal electric field to the liquid crystal layer in the pixel area using a pixel electrode supplied with a data signal via a thin film transistor connected to a gate line and a data line and a common electrode connected to a common line;
   a touch sensor provided for each space between one group of pixels and another group of pixels on the second substrate, the touch sensor detecting a touch by forming a sensing capacitor with a touch object for touching the first substrate; and
   a readout line outputting a sensing signal from the touch sensor,
   wherein the touch sensor comprises:
      a sensing electrode provided to the second substrate to form the sensing capacitor with the touch object,
      first and second sensor gate lines,
      a first sensor thin film transistor supplying a sensing driving voltage to the sensing electrode in response to a control of the first sensor gate line, and
      a second sensor thin film transistor supplying electric charges of the sensing electrode as the sensing signal in response to a control of the second sensor gate line,
   wherein;
      the first and second sensor gate lines are connected respectively to the first and second sensor thin film transistor, are separated from the gate line connected to the thin film transistor of the pixel, and are driven independently from the gate line,
      the first sensor thin film transistor is connected to the second sensor thin film transistor through the sensing electrode,
      the sensing electrode directly forms the sensing capacitor with the touch object, the sensing electrode being one electrode of the sensing capacitor and the touch object being the other electrode of the sensing capacitor, and
      a length of the sensing electrode corresponds to a sum of widths of the pixels included in the one group.

2. The touch sensor embedded liquid crystal display device of claim 1, wherein the first and second sensor gate lines are sequentially driven.

3. The touch sensor embedded liquid crystal display device of claim 1, wherein a size of the sensing signal is proportional to the capacitance (Cf) of the sensing capacitor.

4. The touch sensor embedded liquid crystal display device of claim 1, wherein the sensing signal is proportional to a sum (Cf+Cpara) of the capacitance (Cf) of the sensing capacitor and a parasitic electrostatic capacitance (Cpara) of the sensing electrode and a voltage difference (Vd−Vref) between the sensing driving voltage supplied to the sensing electrode and a reference voltage supplied to the readout line.

5. The touch sensor embedded liquid crystal display device of claim 1, wherein the sensing electrode and the first and second sensor gate lines are formed of the same gate metal of the gate line or the sensing electrode is formed of the same metal of the common electrode or the pixel electrode.

6. The touch sensor embedded liquid crystal display device of claim 1, wherein the first sensor thin film transistor includes a gate electrode connected to the first sensor gate line, a source electrode connected to a power line or the common line and a drain electrode connected to the sensing electrode and wherein the second sensor thin film transistor includes a gate electrode connected to the second sensor gate line, a source electrode connected to the readout line and a drain electrode connected to the sensing electrode.

7. The touch sensor embedded liquid crystal display device of claim 1, wherein the sensing electrode is independently formed by a unit of the touch sensor, wherein the readout line is formed in parallel with the data line by leaving a plurality of data lines in-between to be connected to a plurality of touch sensors arranged in length direction, and wherein the first and second sensor gate lines are formed in parallel with the gate line to be connected to a plurality of touch sensors arranged in width direction.

8. The touch sensor embedded liquid crystal display device of claim 7, wherein each of the first and second sensor gate lines is connected in common to at least one of other first and second sensor gate lines.

9. The touch sensor embedded liquid crystal display device of claim 2, further comprising:
   a gate driver driving the gate line;
   a data driver driving the data line;
   a readout circuit detecting the touch using the sensing signal outputted from the readout line, the readout circuit detecting a position of the touch based on position information of the readout line and the first and second sensor gate lines; and
   a sensor gate driver driving the first and second sensor gate lines.

10. The touch sensor embedded liquid crystal display device of claim 9, wherein the readout circuit is built in the data driver and wherein the sensor gate driver is built in the gate driver.

11. The touch sensor embedded liquid crystal display device of claim 9, wherein the gate and data drivers drive the gate and data lines in a data write interval, respectively and wherein the sensor gate driver drives the first and second sensor gate lines in a touch sensing interval.

12. The touch sensor embedded liquid crystal display device of claim 11, wherein a frame is divided into the data write interval and the touch sensing interval.

13. The touch sensor embedded liquid crystal display device of claim 11, wherein a frame is divided into a plurality of horizontal interval units to enable the data write interval and the touch sensing interval to alternate with each other in each horizontal interval.

14. A method of driving a liquid crystal display device, in which a touch sensor is embedded, comprising the steps of:
   storing data in a plurality of pixels by driving gate lines and data lines in a data write interval;
   applying a horizontal electric field according to data to a liquid crystal layer of each pixel; and
   detecting a touch according to an electrostatic capacitance formed between a touch object touching a top substrate of the liquid crystal display device and the touch sensor by driving the touch sensor provided to each space between one group of pixels and another group of pixels,
   the touch detecting step comprising the steps of:
   supplying a power voltage to a sensing electrode of the touch sensor by driving a first sensor thin film transistor; and
   outputting electric charges of the sensing electrode generated from the touch detection to a readout line as a sensing signal through a second sensor thin film transistor, wherein the first sensor thin film transistor is connected to the second sensor thin film transistor through the sensing electrode,
   wherein:
      first and second sensor gate lines are connected respectively to the first and second sensor thin film transistors, are separated from the gate lines connected to the thin film transistors of the pixels, and are driven independently from the gate lines,
      the sensing electrode directly forms the sensing capacitor with the touch object, the sensing electrode being one electrode of the sensing capacitor and the touch object being the other electrode of the sensing capacitor, and
      a length of the sensing electrode corresponds to a sum of widths of the pixels included in the one group.

15. The method of claim 14, wherein a frame is divided into the data write interval and the touch sensing interval.

16. The method of claim 14, wherein a frame is divided into a plurality of horizontal interval units to enable the data write interval and the touch sensing interval to alternate with each other in each horizontal interval.

\* \* \* \* \*